United States Patent
Lin et al.

(10) Patent No.: US 10,317,749 B2
(45) Date of Patent: Jun. 11, 2019

(54) LIQUID CRYSTAL DISPLAY PANEL

(71) Applicant: AU OPTRONICS CORPORATION, Hsin-chu (TW)

(72) Inventors: Chia-Chu Lin, Hsin-chu (TW); Shu-Hao Huang, Hsin-chu (TW); Sung-Yu Su, Hsin-chu (TW); Hsiao-Wei Cheng, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 99 days.

(21) Appl. No.: 15/598,902

(22) Filed: May 18, 2017

(65) Prior Publication Data

US 2017/0336682 A1    Nov. 23, 2017

(30) Foreign Application Priority Data

May 20, 2016   (TW) .............................. 105115682 A

(51) Int. Cl.
*G09G 3/36*    (2006.01)
*G02F 1/1333*    (2006.01)
(Continued)

(52) U.S. Cl.
CPC ...... *G02F 1/134309* (2013.01); *G02F 1/1368* (2013.01); *G02F 1/13439* (2013.01);
(Continued)

(58) Field of Classification Search
None
See application file for complete search history.

(56) References Cited

U.S. PATENT DOCUMENTS

| 7,369,204 B1 | 5/2008 | Choi et al. |
| 7,952,548 B2 | 5/2011 | Kim et al. |

(Continued)

FOREIGN PATENT DOCUMENTS

| CN | 2424479 Y | 3/2001 |
| CN | 202794784 U | 3/2013 |
| TW | I421576 B | 1/2014 |

OTHER PUBLICATIONS

Office Action issued by (TIPO) Intellectual Property Office, Ministry of Economic Affairs, R. O. C. dated Nov. 22, 2016 for Application No. 105115682, Taiwan.
(Continued)

*Primary Examiner* — Gustavo Polo
(74) *Attorney, Agent, or Firm* — Tim Tingkang Xia, Esq.; Locke Lord LLP

(57) ABSTRACT

A liquid crystal display panel includes first and second substrates facing each other, a liquid crystal layer between the first and second substrates, at least one pixel electrode including at least one slit and between the first substrate and the liquid crystal layer, and at least one first stripe electrode and at least one second stripe electrode between the second substrate and the liquid crystal layer. The pixel electrode and the slit extend in a first direction. The first stripe electrodes and the second stripe electrodes extend respectively in a second direction not parallel to the first direction. In a vertical projection direction from the second substrate toward the first substrate, at least a portion of the at least one pixel electrode is disposed between at least one first stripe electrode and at least one second stripe electrode, and the first and second stripe electrodes are separated from each other.

17 Claims, 17 Drawing Sheets

(51) Int. Cl.
*G02F 1/1343* (2006.01)
*G02F 1/1368* (2006.01)

(52) U.S. Cl.
CPC .. *G02F 1/133345* (2013.01); *G02F 1/134327* (2013.01); *G09G 3/3648* (2013.01); *G02F 2201/121* (2013.01); *G02F 2201/123* (2013.01); *G09G 2300/0426* (2013.01); *G09G 2310/08* (2013.01); *G09G 2320/0252* (2013.01)

(56) References Cited

U.S. PATENT DOCUMENTS

| | | |
|---|---|---|
| 7,965,364 B2 | 6/2011 | Lin et al. |
| 2012/0013825 A1 | 1/2012 | Sugiura et al. |
| 2015/0070336 A1* | 3/2015 | Qu ..................... G09G 3/3648 345/206 |

OTHER PUBLICATIONS

Office Action issued by the State Intellectual Property Office of the Peoples Republic of China dated Oct. 31, 2018 for Application No. CN201610557358.3.

\* cited by examiner

LIQUID CRYSTAL DISPLAY PANEL

CROSS-REFERENCE TO RELATED PATENT APPLICATION

This application claims the benefit of priority to Taiwan Patent Application No. 105115682, filed May 20, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates to a liquid crystal display panel, and more particularly to a liquid crystal display panel that can effectively shorten the response time.

BACKGROUND

With the constant development of liquid crystal display technology, liquid crystal display panels have been widely applied to flat panel display televisions, notebook computers, smart phones and various other consumer electronic products. To resolve the problem that the viewing angle of conventional liquid crystal display panels is too narrow, a fringe field switching (FFS) liquid crystal display panel has been developed in the industry, which is characterized mainly in that a common electrode and the pixel electrodes are disposed in different planes of an array substrate (also referred to as thin film transistor substrate) and a wide viewing angle specification is achieved by using an electric field generated by a voltage difference between the common electrode and the pixel electrodes.

For conventional fringe field switching liquid crystal display panels, response time is an important determining factor of image quality. Generally, the response time includes two parts: rising time and falling time, the response time being a sum of the rising time and the falling time. In the rising time, liquid crystal molecules rotate under the electric field between the common electrode and the pixel electrodes. Therefore, the rising time can be easily controlled. Currently, many methods have been developed for shortening the rising time, but the falling time, which is dependent on the restoration of elastic forces between liquid crystal molecules, cannot be easily controlled. Currently, there is still no method capable of effectively shortening the falling time to further shorten the response time of the liquid crystal display panel.

SUMMARY

One of objectives of the present disclosure is to provide a liquid crystal display panel that can effectively shorten the response time.

To achieve the above objective, the present disclosure provides a liquid crystal display panel, including a first substrate, a second substrate, a liquid crystal layer, at least one pixel electrode, at least one first stripe electrode, and at least one second stripe electrode. The second substrate is disposed facing the first substrate, and the liquid crystal layer is disposed between the first substrate and the second substrate. The at least one pixel electrode is disposed between the first substrate and the liquid crystal layer. The at least one pixel electrode includes at least one slit, and the at least one pixel electrode and the at least one slit are extended in a first direction. The at least one first stripe electrode and the at least one second stripe electrode are disposed between the second substrate and the liquid crystal layer. The at least one first stripe electrode and the at least one second stripe electrode are extended in a second direction. The first direction and the second direction are not parallel to each other. In a vertical projection direction from the second substrate toward the first substrate, at least a portion of the at least one pixel electrode is disposed between the at least one first stripe electrode and the at least one second stripe electrode, and the at least one first stripe electrode and the at least one second stripe electrode are separated from each other.

To achieve the above objective, the present disclosure also provides a method for driving a liquid crystal display panel, including: providing the liquid crystal display panel described above, the liquid crystal display panel further including a common electrode disposed between the first substrate and the liquid crystal layer; in a display period, providing at least one first voltage difference between the at least one pixel electrode and the common electrode, where there is no voltage difference between the at least one first stripe electrode and the at least one second stripe electrode; and in an idle period, reducing the at least one first voltage difference to below 0.5 V, and providing a second voltage difference between the at least one first stripe electrode and the at least one second stripe electrode.

BRIEF DESCRIPTION OF THE DRAWINGS

The foregoing and other exemplary embodiments, advantages, and features of the present disclosure will become more comprehensible by means of the detailed description of the exemplary embodiments of the present disclosure below with reference to the accompanying drawings.

DETAILED DESCRIPTION

In order to enable persons of ordinary skill in the art to further understand the present disclosure, the features of the present disclosure and the effects to be achieved are described in detail below through preferred embodiments of the present disclosure and with reference to the accompanying drawings. In addition, to highlight the features of the present disclosure, the pixel structure and the liquid crystal display panel in the accompanying drawings are drawn schematically, and the specific scale is not limited to the accompanying drawings.

Figure 1:
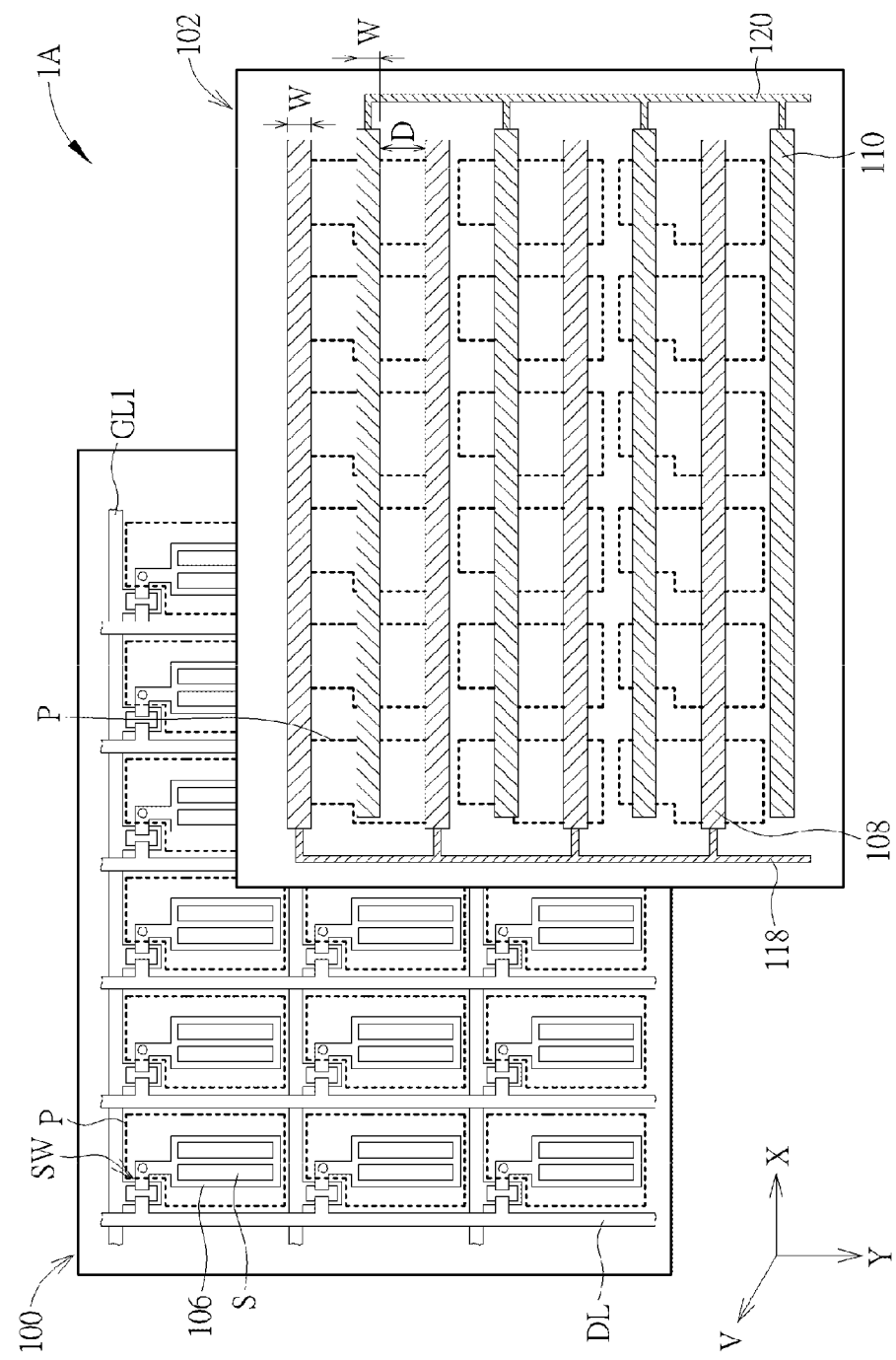
FIG. 1 is an exploded schematic view of a liquid crystal display panel according to a first embodiment of the present disclosure.
Figure 2:
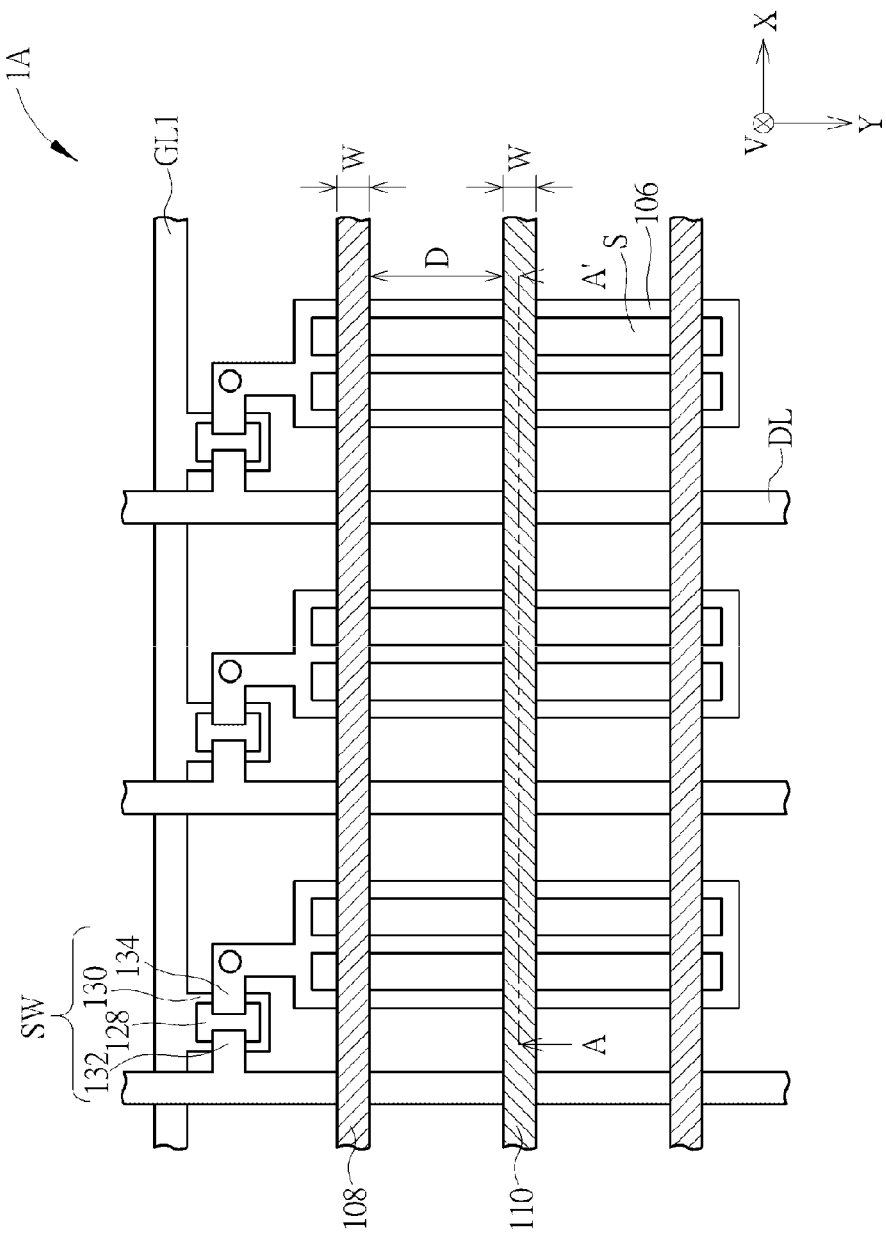
FIG. 2 is a partially enlarged schematic view of the liquid crystal display panel according to the first embodiment of the present disclosure.
Figure 3:
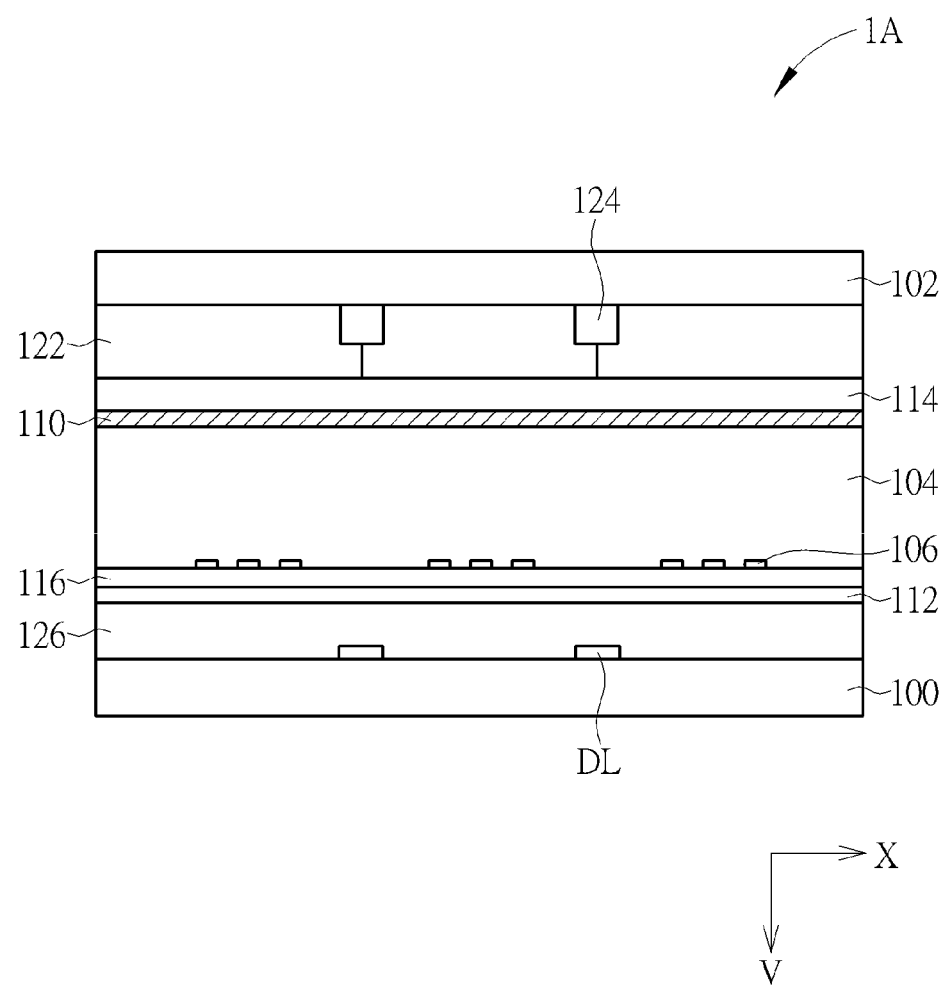
FIG. 3 is a schematic cross-sectional view of the liquid crystal display panel according to the first embodiment of the present disclosure taken along line A-A' in FIG. 2.

Referring to FIG. 1 to FIG. 3, FIG. 1 is an exploded schematic view of a liquid crystal display panel according to a first embodiment of the present disclosure, FIG. 2 is a partially enlarged schematic view of the liquid crystal display panel according to the first embodiment of the present disclosure, and FIG. 3 is a schematic cross-sectional view of the liquid crystal display panel according to the first embodiment of the present disclosure taken along line A-A' in FIG. 2. The following descriptions are given by using a pixel structure of a fringe field switching liquid crystal display panel as an example. However, the present disclosure is not limited thereto, and other types of horizontal-field liquid crystal display panels may also be used. For ease of description, FIG. 1 shows some elements of a liquid crystal display panel 1A, in order to clearly express the main spirit of this embodiment. As shown in FIG. 1 to FIG. 3, the liquid crystal display panel 1A of this embodiment includes a first substrate 100, a second substrate 102, a liquid crystal layer 104, at least one pixel electrode 106, at least one first stripe electrode 108, at least one second stripe electrode 110, a common electrode 112, and an insulation layer 114. The first substrate 100 and the second substrate 102 are disposed facing each other. The first substrate 100 and the second substrate 102 may include light transmissive substrates, such as glass substrates, plastic substrates and quartz substrates, but the present disclosure is not limited thereto. The first substrate 100 and the second substrate 102 may be various rigid substrates or flexible substrates. The liquid crystal layer 104 is disposed between the first substrate 100 and the second substrate 102. In this embodiment, the liquid crystal layer 104 may include, for example, a plurality of nematic liquid crystal molecules. However, the present disclosure is not limited thereto, and other types of liquid crystal layers may also be used. In addition, the liquid crystal layer 104 of this embodiment is exemplified using positive liquid crystal molecules, that is, the liquid crystal molecules have a dielectric anisotropy of greater than 0, but the present disclosure is not limited thereto. The alignment direction of the liquid crystal layer 104 is, for example, parallel to a vertical direction Y, but the present disclosure is not limited thereto.

The pixel electrodes 106 are disposed between the first substrate 100 and the liquid crystal layer 104. Each pixel electrode 106 includes at least one slit S, and the pixel electrodes 106 and the slit S are extended in a first direction. The first direction of this embodiment is the same as the vertical direction Y. The common electrode 112 is disposed between the first substrate 100 and the liquid crystal layer 104. The common electrode 112 of this embodiment is disposed between the pixel electrodes 106 and the first substrate 100, and the common electrode 112 may be a complete plane electrode, but the present disclosure is not limited thereto. In other variant embodiments, the pixel electrodes 106 may be located between the common electrode 112 and the first substrate 100, or the pixel electrodes 106 and the common electrode 112 may be located on a same plane. The pixel electrodes 106 and the common electrode 112 may be transparent electrodes, the material of which may include various transparent conductive materials, for example, indium tin oxide (ITO), indium zinc oxide (IZO), aluminum zinc oxide (AZO), aluminum indium oxide (AIO), indium oxide (InO), gallium oxide (GaO), carbon nanotubes, silver nanoparticles, metal or alloy having a thickness of less than 60 nm, an organic transparent conductive material, or other suitable transparent conductive materials. The liquid crystal display panel 1A may further include a first dielectric layer 116 disposed between the pixel electrodes 106 and the common electrode 112, so as to electrically isolate the pixel electrodes 106 and the common electrode 112.

In addition, the liquid crystal display panel 1A further includes a plurality of first gate lines GL1 and a plurality of data lines DL disposed on the first substrate 100. The first gate lines GL1 and the data lines DL intersect each other, and define a plurality of pixels P. In this embodiment, the first gate lines GL1 are extended in a horizontal direction X, the data lines DL are extended in the vertical direction Y, and the vertical direction Y is perpendicular to the horizontal direction X, but the present disclosure is not limited thereto. In other variant embodiments, the data lines DL may not be straight, and may not be extended in the vertical direction Y but may form an angle with the vertical direction Y. Furthermore, the liquid crystal display panel 1A may further include a second dielectric layer 126 disposed between the data lines DL and the common electrode 112, so as to electrically isolate the data lines DL and the common electrode 112.

The first stripe electrodes 108 and the second stripe electrodes 110 are disposed between the second substrate 102 and the liquid crystal layer 104. The at least one first stripe electrode 108 and the at least one second stripe electrode 110 are extended in a second direction. The first direction is not parallel to the second direction. In other words, the extension directions of the first stripe electrodes 108 and the second stripe electrodes 110 intersect the extension direction of the pixel electrodes 106. In this embodiment, the second direction is the horizontal direction X, but the present disclosure is not limited thereto. When viewed from a vertical projection direction V from the second substrate 102 toward the first substrate 100, as shown in FIG. 2, at least a portion of the at least one pixel electrode 106 is disposed between the at least one first stripe electrode 108 and the at least one second stripe electrode 110, and the first stripe electrodes 108 and the second stripe electrodes 110 are separated and electrically independent from each other. In addition, the first stripe electrodes 108 and the second stripe electrodes 110 each have a width W, a gap D may exist between any two adjacent stripe electrodes of the first stripe electrodes 108 and the second stripe electrodes 110, and the width W is smaller than the gap D, but the present disclosure is not limited thereto. In other variant embodiments, the first stripe electrodes 108 and the second stripe electrodes 110 may have different widths and different gaps. The first stripe electrodes 108 and the second stripe electrodes 110 may be a same patterned conductive layer, but the present disclosure is not limited thereto. The material of the first stripe electrodes 108 and the second stripe electrodes 110 may include indium tin oxide (ITO), indium zinc oxide (IZO), aluminum zinc oxide (AZO), aluminum indium oxide (AIO), indium oxide (InO), gallium oxide (GaO), carbon nanotubes, silver nanoparticles, silver nanowire, an organic transparent conductive material, or other suitable transparent conductive materials, but the present disclosure is not limited thereto. In other variant embodiments, the first stripe electrodes 108 and the second stripe electrodes 110 may be made of a non-transparent conductive material, for example, a metal.

In particular, each row of pixels P in the liquid crystal display panel 1A of this embodiment may correspond to a plurality of first stripe electrodes 108 and a plurality of second stripe electrodes 110. However, the present disclosure is not limited thereto, and each row of pixels P may correspond to only one first stripe electrode 108 and one second stripe electrode 110. In this embodiment, the first stripe electrodes 108 and the second stripe electrodes 110 are parallel to each other and arranged alternately in sequence along a third direction, and the first stripe electrodes 108 and the second stripe electrodes 110 are separated and electrically independent from each other. In this embodiment, the third direction is the vertical direction Y, but the present disclosure is not limited thereto. As shown in FIG. 1, the pixel electrodes 106 are arranged in a plurality of rows, one row of the pixel electrodes 106 overlap at least one of the first stripe electrodes 108 and at least one of the second stripe electrodes 110 in the vertical projection direction V. In addition, the liquid crystal display panel 1A further includes a first connection line 118 and a second connection line 120 respectively located on two corresponding side edges of the second substrate 102, and the first connection line 118 and the second connection line 120 are separated and electrically independent from each other. The first connection line 118 is connected to one end of each first stripe electrode 108, so that the first stripe electrodes 108 are electrically connected to each other, and the second connection line 120 is connected to one end of each second stripe electrode 110, so that the second stripe electrodes 110 are electrically connected to each other. For example, the first stripe electrodes 108 and the second stripe electrodes 110 are disposed between the first connection line 118 and the second connection line 120, and the extension directions of the first connection line 118 and the second connection line 120 are different from the extension directions of the first stripe electrodes 108 and the second stripe electrodes 110. One end of the first stripe electrodes 108 close to the first connection line 118 is extended to connect to the first connection line 118, and one end of the second stripe electrodes 110 close to the second connection line 120 is extended to connect to the second connection line 120. The first connection line 118 and the first stripe electrodes 108 may be formed by a same patterned conductive layer, and the second connection line 120 and the second stripe electrodes 110 may be formed by a same patterned conductive layer. However, the present disclosure is not limited thereto, and the first connection line 118, the first stripe electrodes 108, the second connection line 120, and the second stripe electrodes 110 may all be formed by a same patterned conductive layer. The material of the first connection line 118 and the second connection line 120 of this embodiment may include a transparent or non-transparent conductive material. In this embodiment, the insulation layer 114 is disposed between the first stripe electrodes 108 and the second stripe electrodes 110 and the second substrate 102, but the present disclosure is not limited thereto. The material of the insulation layer 114, the first dielectric layer 116, and the second dielectric layer 126 may include an inorganic dielectric material, for example, silicon nitride, silicon oxide, silicon oxynitride, an organic dielectric material, an organic/inorganic hybrid dielectric material, or a combination thereof. In addition, the insulation layer 114, the first dielectric layer 116, and the second dielectric layer 126 may be of a single-layer structure or a composite layer structure.

The liquid crystal display panel 1A of this embodiment may further include a plurality of active switch devices SW, a storage capacitance element (not shown), an alignment layer (not shown) or a drive control circuit (not shown) disposed between the liquid crystal layer 104 and the first substrate 100, and a color filter layer 122 or a black matrix 124 may be disposed between the liquid crystal layer 104 and the second substrate 102, but the present disclosure is not limited thereto. In other variant embodiments, the color filter layer 122 may be disposed between the liquid crystal layer 104 and the first substrate 100. The active switch device SW includes a gate 130, a source 132, a drain 134, and a semiconductor channel layer 128. The gate 130 is electrically connected to a corresponding first gate line GL1, and the source 132 is electrically connected to a corresponding data line DL, the drain 134 is electrically connected to a corresponding pixel electrode 106. The material of the semiconductor channel layer 128 may be various silicon-based semiconductor materials such as amorphous silicon, polycrystalline silicon, microcrystalline silicon and nanocrystalline silicon, or oxide semiconductor materials such as indium gallium zinc oxide (IGZO).

Figure 4:
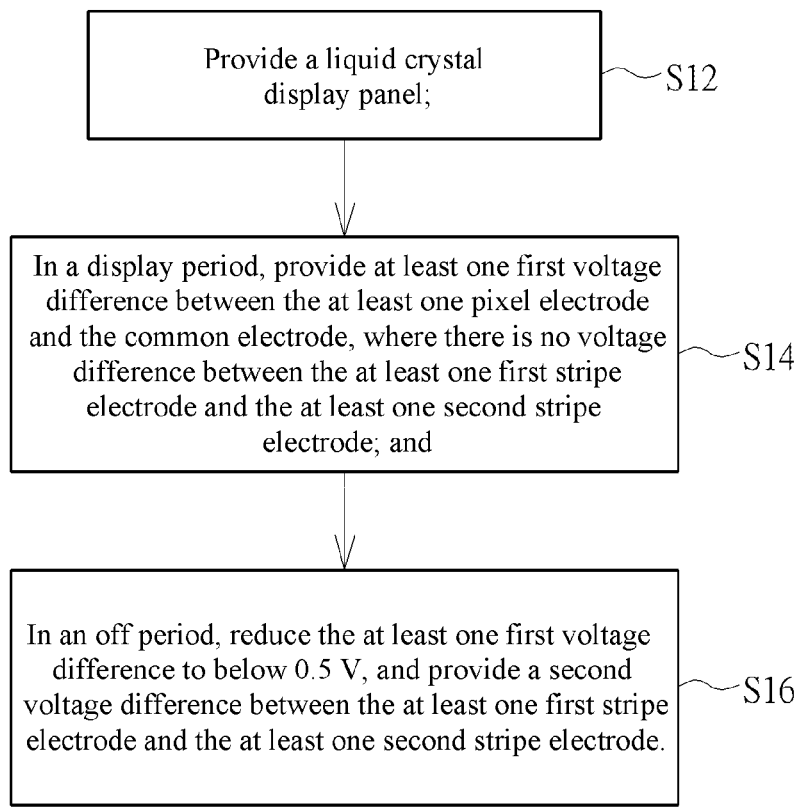
FIG. 4 is a flowchart of steps of a method for driving a liquid crystal display panel according to the first embodiment of the present disclosure.

In this embodiment, the pixel electrodes 106 of the liquid crystal display panel 1A are extended in the first direction (that is, the vertical direction Y), and the first stripe electrodes 108 and the second stripe electrodes 110 are extended in the second direction (that is, the horizontal direction X). When no electric field is applied between the pixel electrodes 106 and the common electrode 112, the long axis of positive liquid crystal molecules is substantially disposed along the alignment direction of the liquid crystal layer 104 (that is, the vertical direction Y). Referring to FIG. 4, FIG.

4 is a flowchart of steps of a method for driving a liquid crystal display panel according to the first embodiment of the present disclosure. As shown in FIG. 4, the method for driving a liquid crystal display panel 1A of this embodiment includes the following steps:

step S12: providing a liquid crystal display panel;

step S14: in a display period, providing at least one first voltage difference between the at least one pixel electrode and the common electrode, where there is no voltage difference between the at least one first stripe electrode and the at least one second stripe electrode; and step S16: in an idle period, reducing the at least one first voltage difference to below 0.5 V, and providing a second voltage difference between the at least one first stripe electrode and the at least one second stripe electrode.

Figure 5:
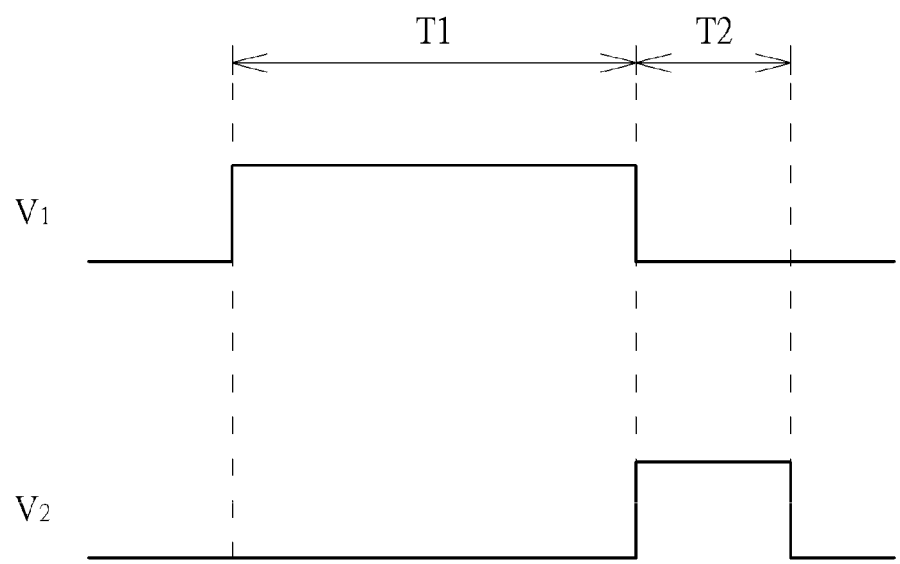
FIG. 5 is a timing diagram of a first voltage difference and a second voltage difference of the liquid crystal display panel according to the first embodiment of the present disclosure.

The driving method of this embodiment will be further described below in detail. Referring to FIG. 5, FIG. 2, and FIG. 3, FIG. 5 is a timing diagram of a first voltage difference V1 and a second voltage difference V2 of the liquid crystal display panel according to the first embodiment of the present disclosure. As shown in FIG. 2, FIG. 3, and FIG. 5, in the display period T1, at least one first voltage difference V1 is provided between the at least one pixel electrode 106 and the common electrode 112, to generate an electric field in the second direction, and further drive the long axis of positive liquid crystal molecules to deflect toward the second direction, so as to enable corresponding pixels and display an image. In addition, in the display period T1, there is no voltage difference between the first stripe electrodes 108 and the second stripe electrodes 110. In particular, the pixel electrodes 106 provides a pixel signal, the common electrode 112 provides a common signal, the first stripe electrode provides a first voltage signal, and the second stripe electrode provides a second voltage signal. In the display period T1, a voltage difference between the pixel signal and the common signal is the first voltage difference V1, and the voltages of the first voltage signal and the second voltage signal are the same as that of the common signal. In the idle period T2, for example, when the image display is finished or pixels need to be switched to dark, the first voltage difference V1 may be reduced to below 0.5 V, and the first voltage signal and the second voltage signal respectively provide different voltages to the first stripe electrodes 108 and the second stripe electrodes 110, so that the second voltage difference V2 exists between the at least one first stripe electrode 108 and the at least one second stripe electrode 110, or the second voltage difference V2 exists between any two adjacent stripe electrodes of the first stripe electrodes 108 and the second stripe electrodes 110. The provision of the second voltage difference V2 lasts for 1 to 10 ms, and preferably 5 to 10 ms. In the idle period T2, a voltage difference between the first voltage signal and the second voltage signal is the second voltage difference V2. In this case, the first stripe electrodes 108 and the second stripe electrodes 110 generate an electric field perpendicular to the second direction, the direction of the electric field in this embodiment being the first direction, so as to assist in and accelerate the restoration of the long axis of positive liquid crystal molecules to the initial position, that is, to be parallel to the first direction. Therefore, disposing the first stripe electrodes 108 and the second stripe electrodes 110 whose extension directions are not parallel to that of the pixel electrodes 106 in the liquid crystal display panel 1A of this embodiment can effectively shorten the falling time, thereby effectively shortening the response time of the liquid crystal display panel 1A. In addition, in the liquid crystal display panel 1A, the first stripe electrodes 108, the second stripe electrodes 110, and the common electrode 112 may have a same voltage in the display period T1; in the idle period T2, the second voltage difference V2 is preferably 5 V to 30 V, and more preferably 8 V to 15 V, but the present disclosure is not limited thereto. On the other hand, the width W of the first stripe electrodes 108 and the second stripe electrodes 110, the gap D between the first stripe electrode 108 and the adjacent second stripe electrodes 110, and the second voltage difference V2 of this embodiment preferably satisfy the following formula (1), but the present disclosure is not limited thereto.

$$0.5 \text{ V/}\mu m < \frac{V_2}{(W+D)} < 3 \text{ V/}\mu m \qquad \text{formula (1)}$$

The liquid crystal display panel of the present disclosure is not limited to the foregoing embodiment. The following will describe liquid crystal display panels of other embodiments of the present disclosure and their variant embodiments in sequence. To distinguish the differences between the embodiments and their variant embodiments and for brevity of description, like symbols are used to denote like parts in the following embodiments and variant embodiments, and only the differences between the embodiments and their variant embodiments are described, and the same part will not be repeatedly described.

Figure 6:
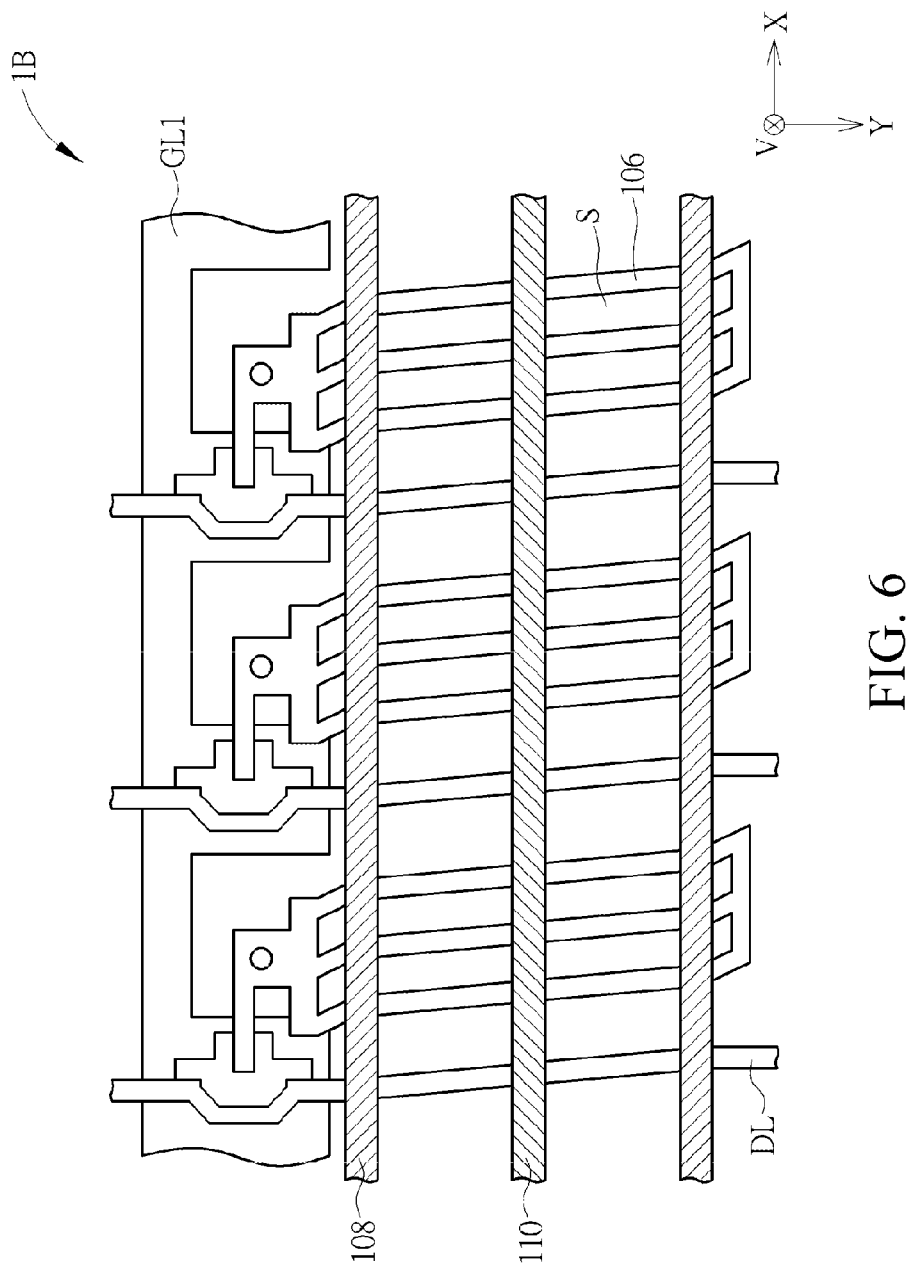
FIG. 6 is a partially enlarged schematic view of a liquid crystal display panel according to a first variant embodiment of the first embodiment of the present disclosure.

Referring to FIG. 6, FIG. 6 is a partially enlarged schematic view of a liquid crystal display panel according to a first variant embodiment of the first embodiment of the present disclosure. In order to clearly express the main spirit of this variant embodiment, the common electrode is not shown in FIG. 6. As shown in FIG. 6, the difference between this variant embodiment and the first embodiment lies in that the pixel electrodes 106 and the slit S are extended in the first direction rather than the vertical direction Y, an acute angle exists between the first direction and the second direction (that is, the horizontal direction X) in which the first stripe electrodes 108 and the second stripe electrodes 110 are extended, and the angle is 85 degrees to 90 degrees, but the present disclosure is not limited thereto. In other variant embodiments, the angle may vary otherwise, and the angle may be substantially in the range of 70 degrees to 90 degrees, preferably 80 degrees to 90 degrees, and is more preferably 90 degrees. On the other hand, the extension directions of the first stripe electrodes 108 and the second stripe electrodes 110 of this variant embodiment are parallel to the extension direction of the first gate lines GL1, but the present disclosure is not limited thereto. In other variant embodiments, the extension direction of the first stripe electrodes 108 or the second stripe electrodes 110 of this variant embodiment may not be parallel to the extension direction of the first gate lines GL1. For example, an acute angle may exist between the extension direction of the first stripe electrodes 108 or the second stripe electrodes 110 of this variant embodiment and the extension direction of the first gate lines GL1, and the acute angle may be less than 10 degrees. In addition, this variant embodiment may also be applied to other embodiments.

Figure 7:
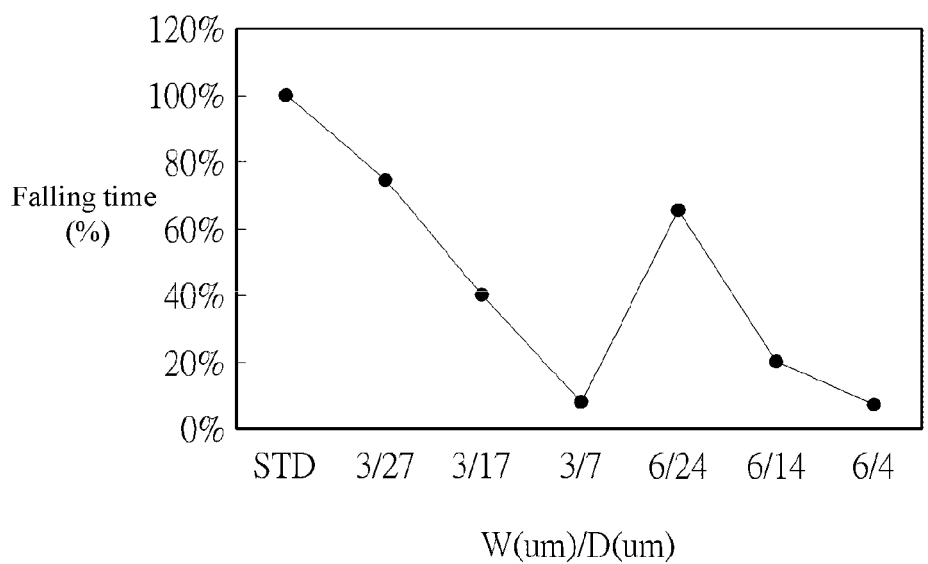
FIG. 7 is a diagram illustrating a relationship between the width to gap ratio of a stripe electrode and the falling time in the liquid crystal display panel according to the first variant embodiment of the first embodiment of the present disclosure.

Referring to FIG. 7, FIG. 7 is a diagram illustrating a relationship between the width to gap ratio of a stripe electrode and the falling time in the liquid crystal display panel according to the first variant embodiment of the first embodiment of the present disclosure. In this variant embodiment, the liquid crystal layer 104 of a liquid crystal display panel 1B includes positive liquid crystal molecules.

A method for driving the liquid crystal display panel 1B is the same as that described in the first embodiment, and the details are not described herein again. As shown in FIG. 7, STD represents a conventional liquid crystal display panel having no stripe electrode, and liquid crystal display panels having the first stripe electrodes 108 and the second stripe electrodes 110 are compared with STD. Using the falling time of STD as a reference, the second voltage differences V2 of six liquid crystal display panels having the first stripe electrodes 108 and the second stripe electrodes 110 are all 20 V, and the width W and the gap D of the first stripe electrodes 108 and the second stripe electrodes 110 both satisfy the formula (1). However, when the second voltage difference V2 is less than 5 V, the effect is unsatisfactory, or even no effect can be achieved. In addition, an existing system cannot provide a second voltage difference V2 greater than 30 V. Therefore, the effect achieved when the formula (1) is satisfied is better. As can be seen from FIG. 7, in this embodiment, disposing the first stripe electrodes 108 and the second stripe electrodes 110 on the second substrate 102 of the liquid crystal display panel 1B can effectively reduce the falling time of the liquid crystal display panel 1B, and therefore can effectively reduce the response time, thereby improving the display quality.

Figure 8:
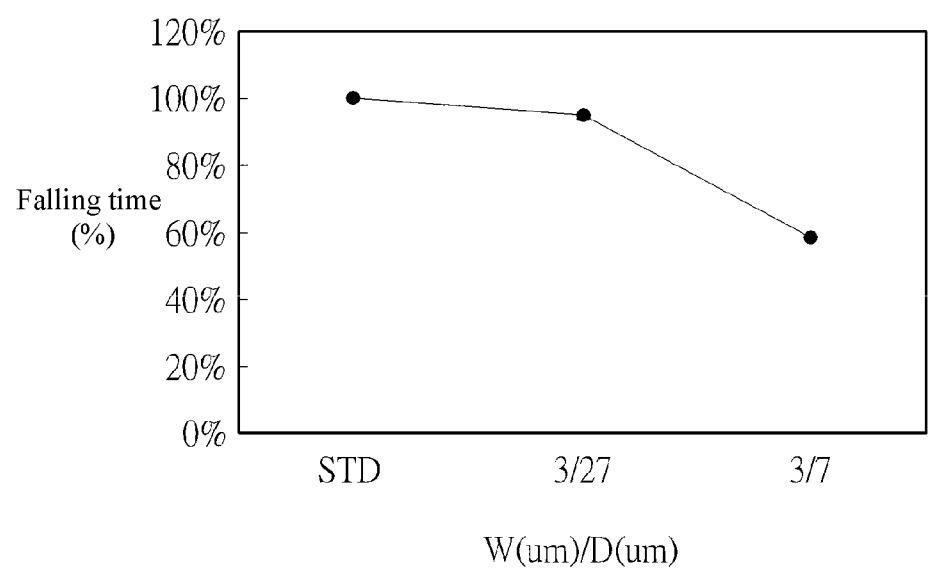
FIG. 8 is a diagram illustrating a relationship between the width to gap ratio of a stripe electrode and the falling time in a liquid crystal display panel according to a second variant embodiment of the first embodiment of the present disclosure.

Referring to FIG. 8, FIG. 8 is a diagram illustrating a relationship between the width to gap ratio of a stripe electrode and the falling time in a liquid crystal display panel according to a second variant embodiment of the first embodiment of the present disclosure. The difference between this variant embodiment and the first embodiment lies in that the liquid crystal layer 104 of the liquid crystal display panel is exemplified using negative liquid crystal molecules, that is, the liquid crystal molecules have a dielectric anisotropy of less than 0. Using the structure of the liquid crystal display panel 1A of FIG. 1 as an example, assuming that the alignment direction of the liquid crystal layer 104 is parallel to the horizontal direction X, the long axis of negative liquid crystal molecules may be parallel to the horizontal direction X, but the present disclosure is not limited thereto. In the display period T1, the first voltage difference V1 may be provided between the pixel electrodes 106 and the common electrode 112, to generate an electric field perpendicular to the first direction, and further drive the long axis of negative liquid crystal molecules to deflect toward the first direction (that is, the vertical direction Y), so as to display an image. In the idle period T2, the first voltage difference V1 may be reduced to below 0.5 V, and the second voltage difference V2 may be provided between the first stripe electrodes 108 and the second stripe electrodes 110, to generate an electric field perpendicular to the second direction between the first stripe electrodes 108 and the second stripe electrodes 110, so as to assist in and accelerate the restoration of the long axis of negative liquid crystal molecules to the initial position, that is, to be parallel to the horizontal direction X. As shown in FIG. 8, STD represents a conventional liquid crystal display panel having no stripe electrode, and liquid crystal display panels having the first stripe electrodes 108 and the second stripe electrodes 110 are compared with STD. Using the falling time of STD as a reference, the second voltage differences V2 of the liquid crystal display panels having the first stripe electrodes 108 and the second stripe electrodes 110 are all 20 V, and the width W and the gap D of the first stripe electrodes 108 and the second stripe electrodes 110 both satisfy the formula (1). As can be seen from FIG. 8, in this embodiment, disposing the first stripe electrodes 108 and the second stripe electrodes 110 on the second substrate 102 of the liquid crystal display panel surely can effectively reduce the falling time of the liquid crystal display panel, and therefore can effectively reduce the response time, thereby improving the display quality. In addition, this variant embodiment may also be applied to other embodiments.

Figure 9:
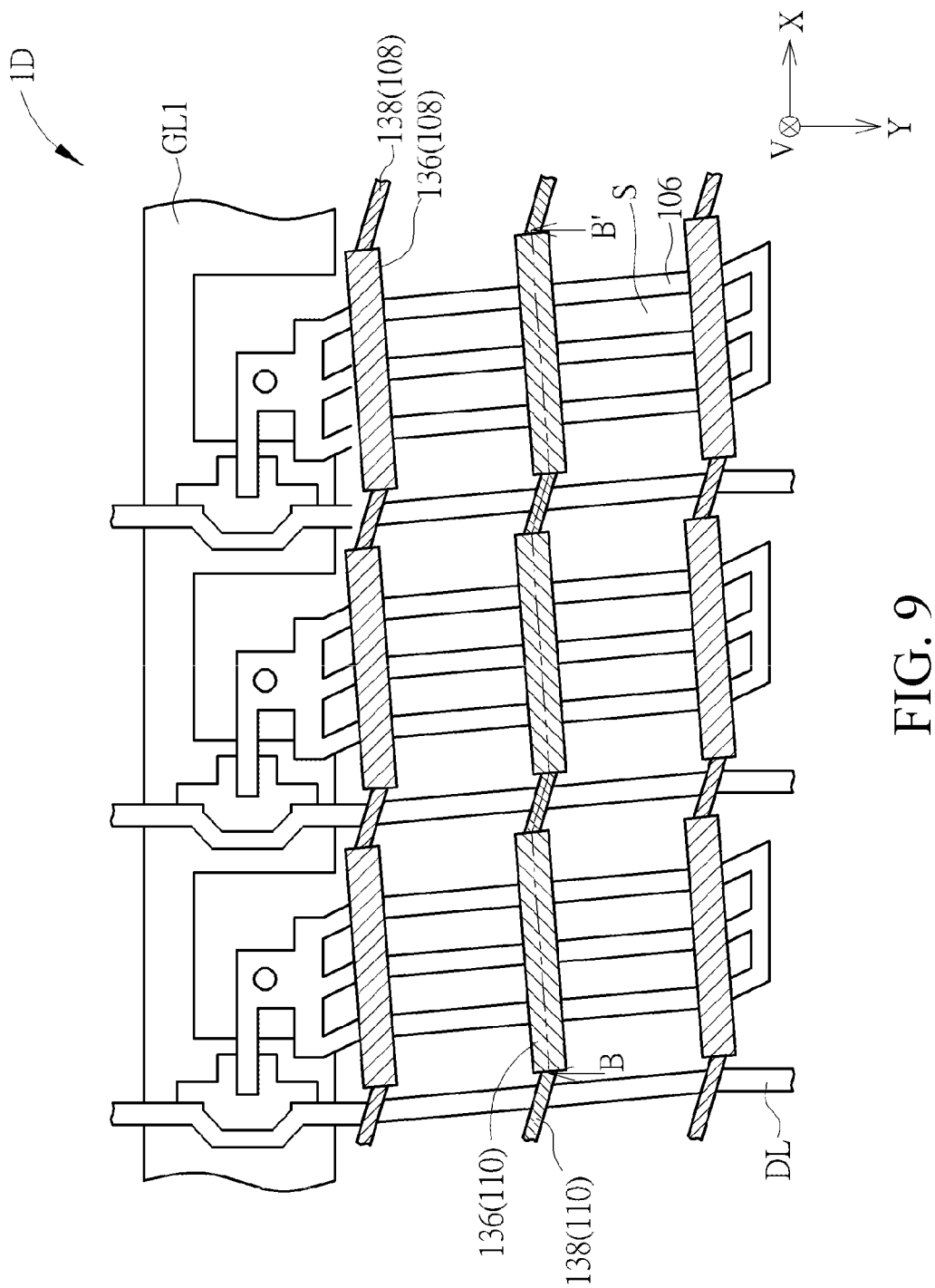
FIG. 9 is a partially enlarged schematic view of a liquid crystal display panel according to a third variant embodiment of the first embodiment of the present disclosure.
Figure 10:
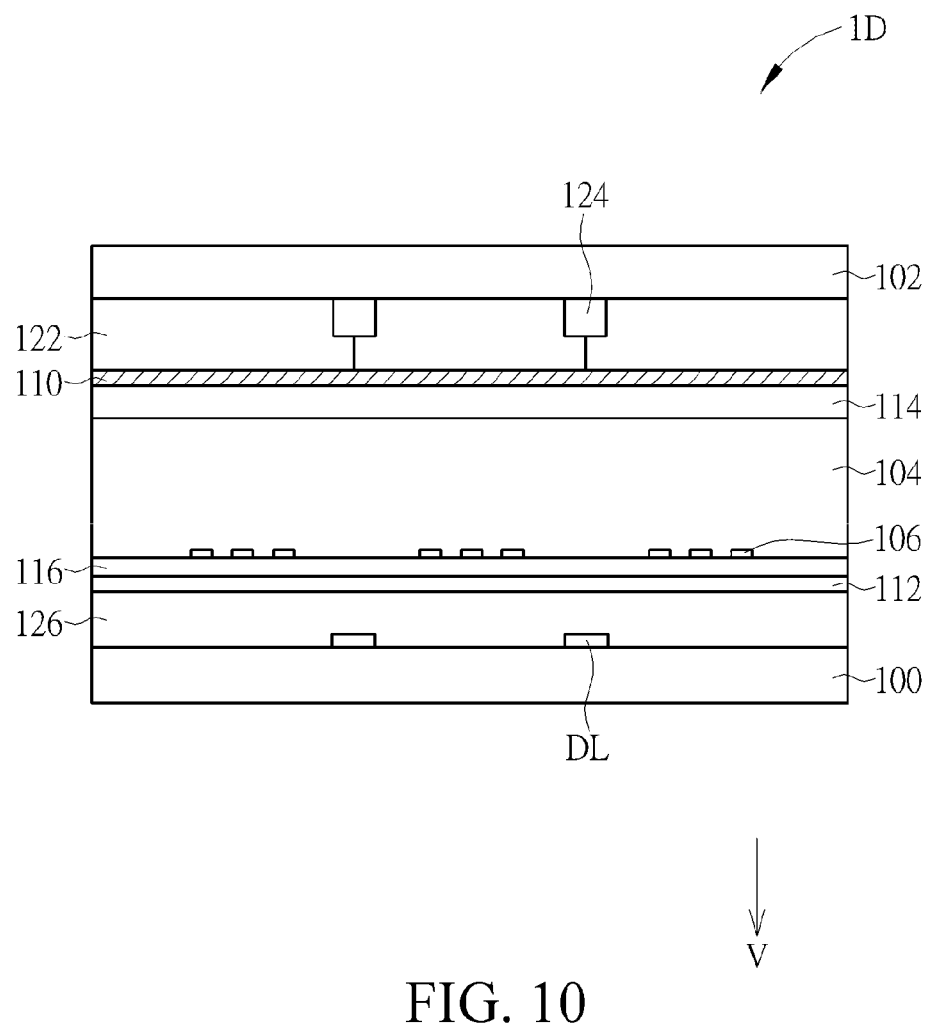
FIG. 10 is a schematic cross-sectional view of the liquid crystal display panel according to the third variant embodiment of the first embodiment of the present disclosure taken along line B-B' in FIG. 9.

Referring to FIG. 9 and FIG. 10, FIG. 9 is a partially enlarged schematic view of a liquid crystal display panel 1D according to a third variant embodiment of the first embodiment of the present disclosure, and FIG. 10 is a schematic cross-sectional view of the liquid crystal display panel 1D according to the third variant embodiment of the first embodiment of the present disclosure taken along line B-B' in FIG. 9. As shown in FIG. 9, the difference between this variant embodiment and the first embodiment lies in that the first stripe electrodes 108 and the second stripe electrodes 110 respectively includes a plurality of stripe sections 136 and a plurality of connection sections 138. Each connection section 138 is used for connecting any two adjacent stripe sections 136. The stripe sections 136 are extended in the second direction. The second direction is not the horizontal direction X, but forms an angle with the horizontal direction X, but the present disclosure is not limited thereto. It should be noted that, the first direction and the second direction of this variant embodiment are perpendicular to each other. In other words, the extension directions of the stripe sections 136 and the pixel electrodes 106 are perpendicular to each other. The difference between this variant embodiment and the first variant embodiment also lies in that the extension directions of the stripe sections 136 and the connection sections 138 are different from each other and both are not parallel to the extension direction of the first gate lines GL1, the first gate lines GL1 may still be extended in the horizontal direction X, an acute angle may exist between the second direction and the horizontal direction X, and the acute angle may range from 10 degrees to −10 degrees. In addition, the connection sections 138 are preferably masked by the black matrix 124, but the present disclosure is not limited thereto. As shown in FIG. 10, the difference between this variant embodiment and the first variant embodiment also lies in that the insulation layer 114 is disposed between the first stripe electrodes 108 and the second stripe electrodes 110 and the liquid crystal layer 104. This variant embodiment may also be applied to other embodiments.

Figure 11:
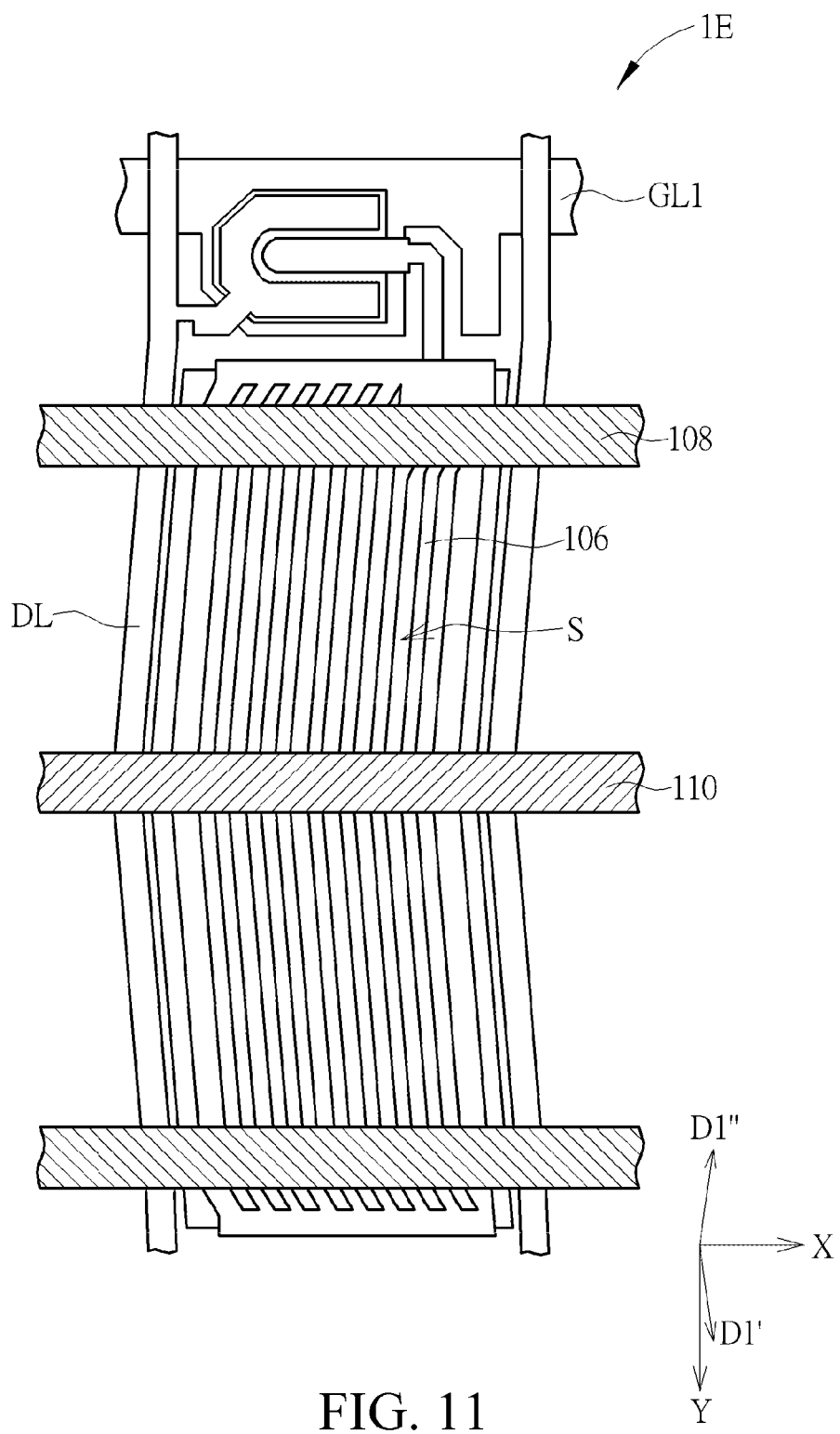
FIG. 11 is a partially enlarged schematic view of a liquid crystal display panel according to a fourth variant embodiment of the first embodiment of the present disclosure.

Referring to FIG. 11, FIG. 11 is a partially enlarged schematic view of a liquid crystal display panel according to a fourth variant embodiment of the first embodiment of the present disclosure. For ease of description, FIG. 11 merely shows one pixel of a liquid crystal display panel 1E, in order to clearly express the main spirit of this variant embodiment. As shown in FIG. 11, the difference between this variant embodiment and the first embodiment lies in the shape of the pixel electrodes 106. In particular, the pixel electrodes 106 of this variant embodiment may be divided into two parts (for example, an upper half and a lower half) extended in two different first directions D1' and D1". In other words, the slit S may be of a V-shape, but the present disclosure is not limited thereto. Compared with the foregoing embodiments, in this variant embodiment, the pixel electrodes 106 extended in at least two different directions are disposed in a same pixel, so that a liquid crystal molecule has at least two deflection areas when displayed, thereby improving the viewing quality of the liquid crystal display panel 1E. It should be noted that in this case, the at least one first stripe electrode 108 or the second stripe electrodes 110 may be disposed at a junction of the two deflection areas, in order to achieve a desirable display effect. In addition, disposing the first stripe electrodes 108 and the second stripe electrodes 110 whose extension directions are not parallel to that of the pixel electrodes 106 in the liquid crystal display panel 1E can effectively shorten the falling time, thereby effectively shortening the response time of the liquid crystal display panel 1E. In addition, this variant embodiment may also be applied to other embodiments.

Figure 12:
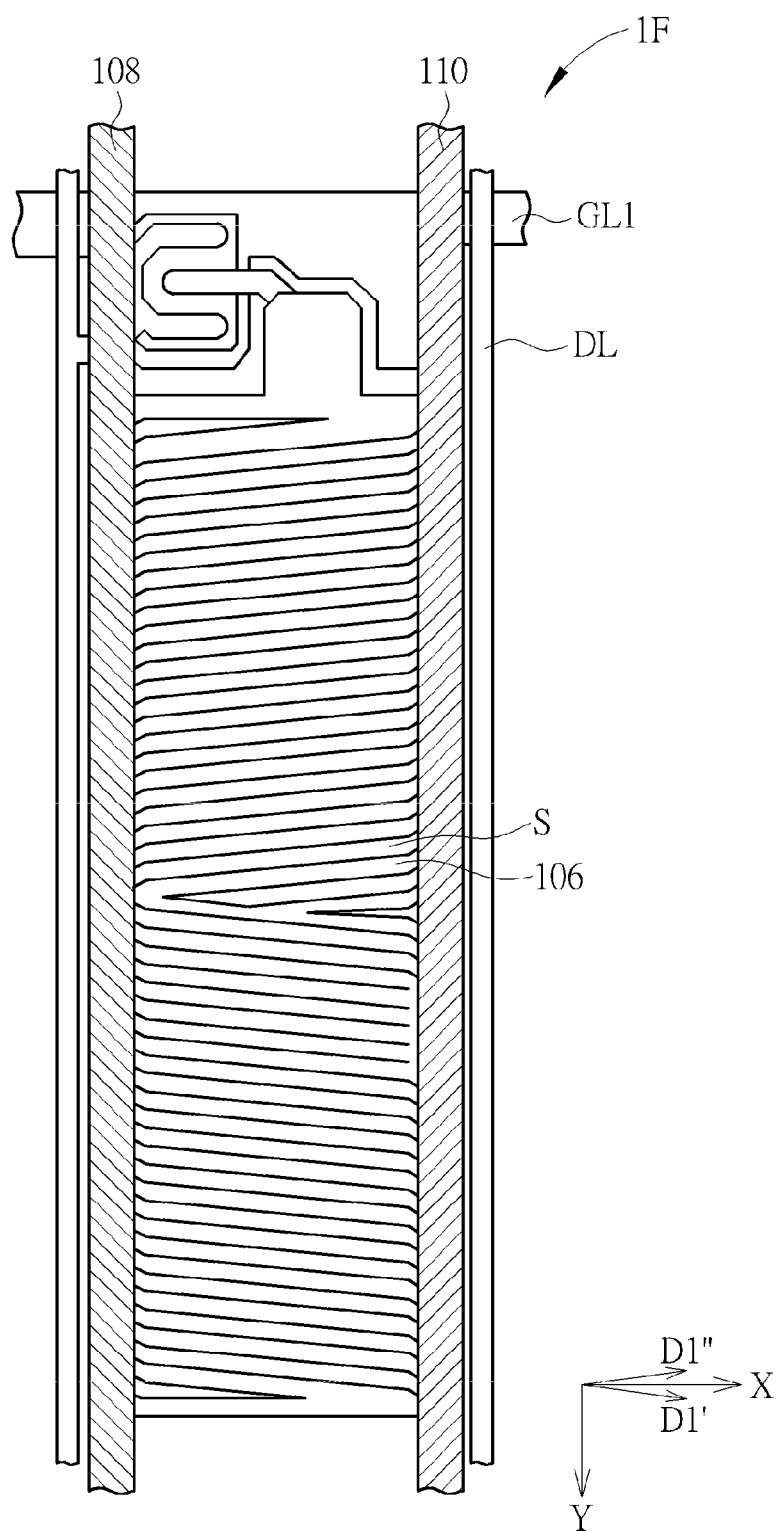
FIG. 12 is a partially enlarged schematic view of a liquid crystal display panel according to a second embodiment of the present disclosure.

Referring to FIG. 12, FIG. 12 is a partially enlarged schematic view of a liquid crystal display panel according to a second embodiment of the present disclosure. For ease of description, FIG. 12 merely shows one pixel of a liquid crystal display panel 1F, in order to clearly express the main spirit of this embodiment. As shown in FIG. 12, the shape of the pixel electrodes 106 and the extension directions of the first stripe electrodes 108 and the second stripe electrodes 110 in this embodiment are different from those in the first embodiment. In particular, the pixel electrodes 106 of this embodiment may be divided into two parts (for example, an upper half and a lower half) extended in two different first directions D1' and D1". The difference between this embodiment and the first embodiment lies in that the first directions in which the pixel electrodes 106 and the slit S of the first embodiment are extended and the horizontal direction X in which the first gate lines GL1 are extended are perpendicular to each other in the first embodiment, while an acute angle exists between the first directions D1' and D1" of this embodiment and the horizontal direction X in which the first gate lines GL1 are extended, but the present disclosure is not limited thereto. On the other hand, the second direction in which the first stripe electrodes 108 and the second stripe electrodes 110 of this embodiment are extended is the vertical direction Y, and is therefore perpendicular to the extension direction of the first gate lines GL1. In this way, the second direction is not perpendicular to the first directions D1' and D1". In addition, the first stripe electrodes 108 and the second stripe electrodes 110 are arranged alternately in sequence along the third direction, and the third direction of this embodiment is parallel to the extension direction of the first gate lines GL1 (that is, the horizontal direction X), but the present disclosure is not limited thereto. In this embodiment, the pixel electrodes 106 extended in at least two different directions are disposed in a same pixel, so that a liquid crystal molecule has multiple deflection areas when displayed, thereby improving the viewing quality of the liquid crystal display panel 1F. In addition, disposing the first stripe electrodes 108 and the second stripe electrodes 110 that are not parallel to the pixel electrodes 106 in the liquid crystal display panel 1F can effectively shorten the falling time, thereby effectively shortening the response time of the liquid crystal display panel 1F. In addition, this embodiment may also be applied to other embodiments.

Figure 13:
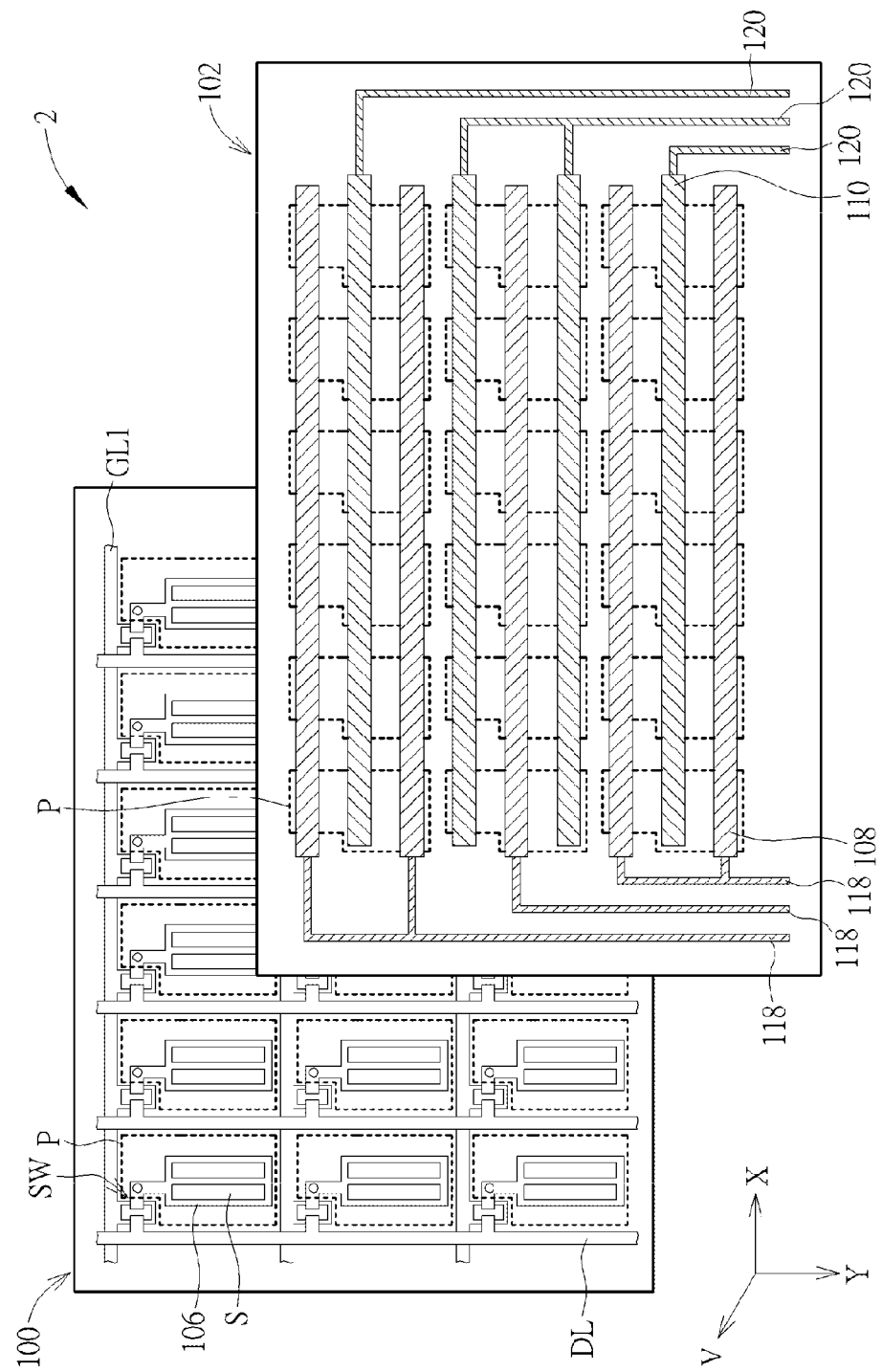
FIG. 13 is an exploded schematic view of a liquid crystal display panel according to a third embodiment of the present disclosure.

Referring to FIG. 13, FIG. 13 is an exploded schematic view of a liquid crystal display panel according to a third embodiment of the present disclosure. As shown in FIG. 13, the difference between this embodiment and the first embodiment lies in that the liquid crystal display panel 2 includes a plurality of first connection lines 118 and a plurality of second connection lines 120. The first stripe electrodes 108 and the second stripe electrodes 110 that are disposed corresponding to one row of pixel electrodes 106 overlap the row of pixel electrodes 106 in the vertical projection direction V, where at least one first stripe electrode 108 may be connected to one of the first connection lines 118, and at least one second stripe electrode 110 may be connected to one of the second connection lines 120. In addition, the first stripe electrodes 108 corresponding to different rows of pixel electrodes 106 may be respectively connected to different first connection lines 118, and the second stripe electrodes 110 corresponding to different rows of pixel electrodes 106 may be respectively connected to different second connection lines 120. Furthermore, the first connection lines 118 are separated from each other, the second connection lines 120 are separated from each other, and the first connection lines 118 are also separated from the second connection lines 120. On the other hand, in a method for driving the liquid crystal display panel 2 of this embodiment, the step of providing at least one first voltage difference V1 includes providing a plurality of first voltage differences V1 respectively between a plurality of pixel electrodes 106 in a same row and the common electrode 112, and the step of reducing the at least one first voltage difference V1 to below 0.5 V includes reducing the first voltage difference V1 between the plurality of pixel electrodes 106 in a same row and the common electrode 112 to below 0.5 V. In addition, the step of providing a second voltage difference V2 includes providing the second voltage difference V2 between the first stripe electrode 108 and the second stripe electrode 110 that correspond to a same row. In this way, the first stripe electrodes 108 and the second stripe electrodes 110 corresponding to different rows of pixel electrodes 106 in this embodiment can be respectively driven by different first connection lines 118 and second connection lines 120. In other words, when at least one row of pixels needs to be set to dark, an electric field may be generated by the first stripe electrode 108 and the second stripe electrode 110 that correspond to this row, to effectively shorten the falling time, thereby effectively shortening the response time.

Figure 14:
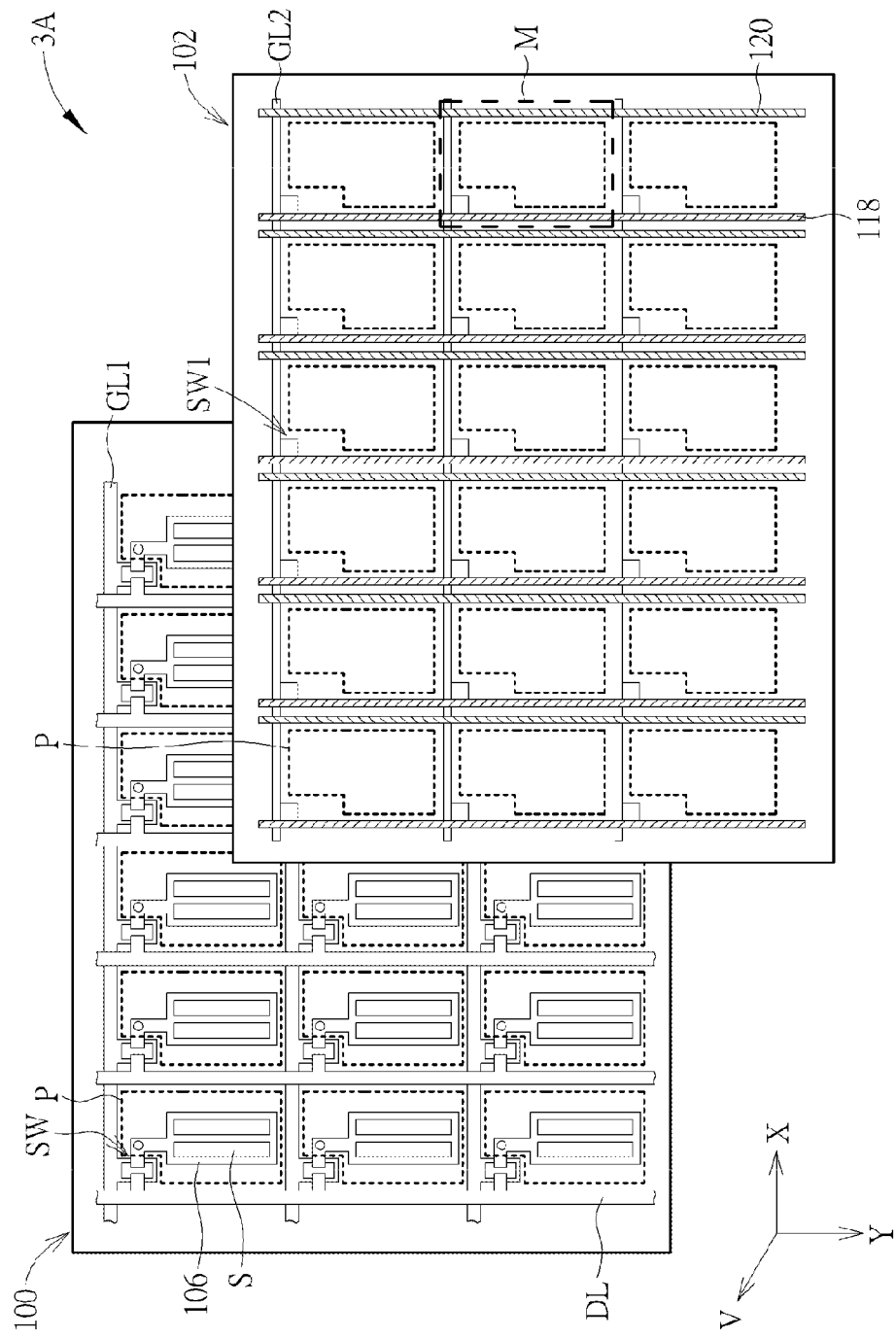
FIG. 14 is an exploded schematic view of a liquid crystal display panel according to a fourth embodiment of the present disclosure.
Figure 15:
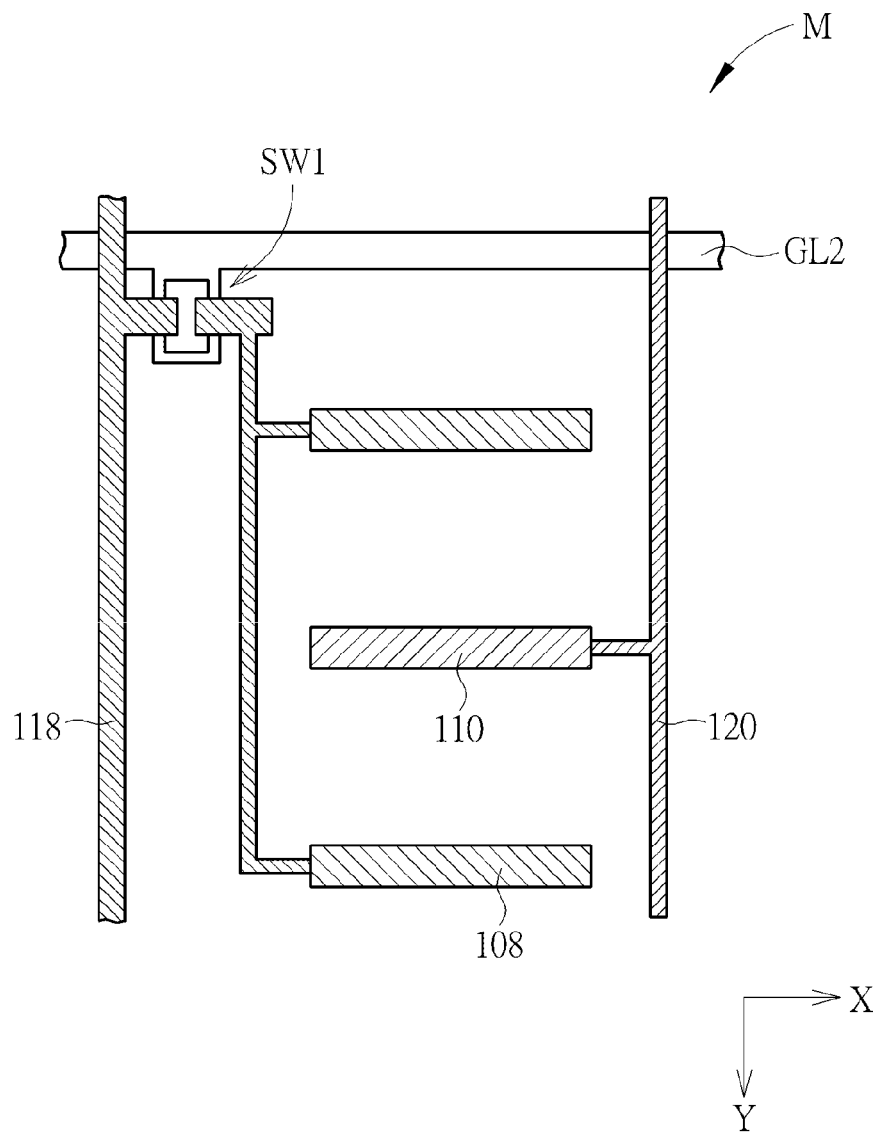
FIG. 15 is an enlarged schematic view of an area M in FIG. 14 according to the present disclosure.

Referring to FIG. 14 and FIG. 15, FIG. 14 is an exploded schematic view of a liquid crystal display panel 3A according to a fourth embodiment of the present disclosure, and FIG. 15 is an enlarged schematic view of an area M in FIG. 14 according to the present disclosure. For brevity of the accompanying drawings and to enable the readers to better understand this embodiment, the first stripe electrodes and the second stripe electrodes are not shown in FIG. 14. For the manner of disposing the first stripe electrodes and the second stripe electrodes of this embodiment, reference can be made to FIG. 15. As shown in FIG. 14 and FIG. 15, the difference between this embodiment and the first embodiment lies in that the liquid crystal display panel 3A further includes a plurality of first switch devices SW1, a plurality of second gate lines GL2, a plurality of first connection lines 118, and a plurality of second connection lines 120 disposed on the second substrate 102. The extension direction of the second gate line GL2 is substantially parallel to that of the first gate lines GL1 on the first substrate 100, and the extension directions of the first connection lines 118 and the second connection lines 120 are substantially parallel to that of the data lines DL on the first substrate 100, that is, the second gate lines GL2, the first connection lines 118, and the second connection lines 120 intersect each other. The pixel electrodes 106 on the first substrate 100 are arranged in a plurality of columns. In the vertical projection direction V, each first connection line 118 and each second connection line 120 are respectively disposed corresponding to two opposite sides of each column of pixel electrodes 106, and the first stripe electrodes 108 and the second stripe electrodes 110 are respectively disposed between the first connection lines 118 and the second connection lines 120 that correspond to each column of pixel electrodes 106. The second gate lines GL2 may be, for example, disposed corresponding to the first gate lines GL1. In this embodiment, the second gate lines GL2 may be extended in the horizontal direction X, and the first connection lines 118 and the second connection lines 120 may be extended in the vertical direction Y, but the present disclosure is not limited thereto. A gate, a source, and a drain of the first switch device SW1 are respectively electrically connected to the second gate line GL2, the first connection lines 118, and at least one first stripe electrode 108. The first stripe electrode 108 is electrically connected to the corresponding first connection line 118 by the first switch device SW1. The second connection line 120 is directly connected to at least one second stripe electrode 110 that corresponds to a same column of pixel electrodes 106. Compared with the first embodiment, in this embodiment, the first stripe electrodes 108 and the second stripe electrodes 110 that correspond to different pixels in a same row are independent of each other, but are not continuously extended. On the other hand, at least one first stripe electrodes 108 and at least one second stripe electrode 110 overlap at least one pixel electrode 106 in the vertical projection direction V. In a method for driving the liquid crystal display panel 3A of this embodiment, the step of providing a second voltage difference V2 includes providing the second voltage difference V2 between the first stripe electrodes 108 and the second stripe electrodes 110 corresponding to the pixel electrodes 106. In other words, in this embodiment, for different pixels, signals having different voltages may be transmitted through the first connection lines 118 and the second connection lines 120 that correspond to the pixels or pixel columns where the pixel electrodes 106 of the pixels are located. Furthermore, because the first stripe electrode 108 is electrically connected to the corresponding first connection line 118 by the first switch device SW1, the first stripe electrode 108 of at least one pixel in a same pixel column may be selected, by using the first switch device SW1, to receive the signal transmitted from the first connection line 118, which further generates a second voltage difference V2 with another signal received by the second stripe electrode 110 from the second connection line 120. For example, the second connection line 120 may be further connected to the common electrode 112, the voltage of the signal transmitted to the second stripe electrode 110 may be a common voltage of, for example, 0 V, and the voltage of the signal transmitted from the first connection line 118 may range, for example, from 5 V to 30 V, and more preferably from 8 V to 15 V, but the present disclosure is not limited thereto. According to the liquid crystal display panel 3A of this embodiment, when a pixel needs to be set to dark, an electric field may be generated by the first stripe electrode 108 and the second stripe electrode 110 that correspond to the pixel, to effectively shorten the falling time, thereby effectively shortening the response time.

Figure 16:
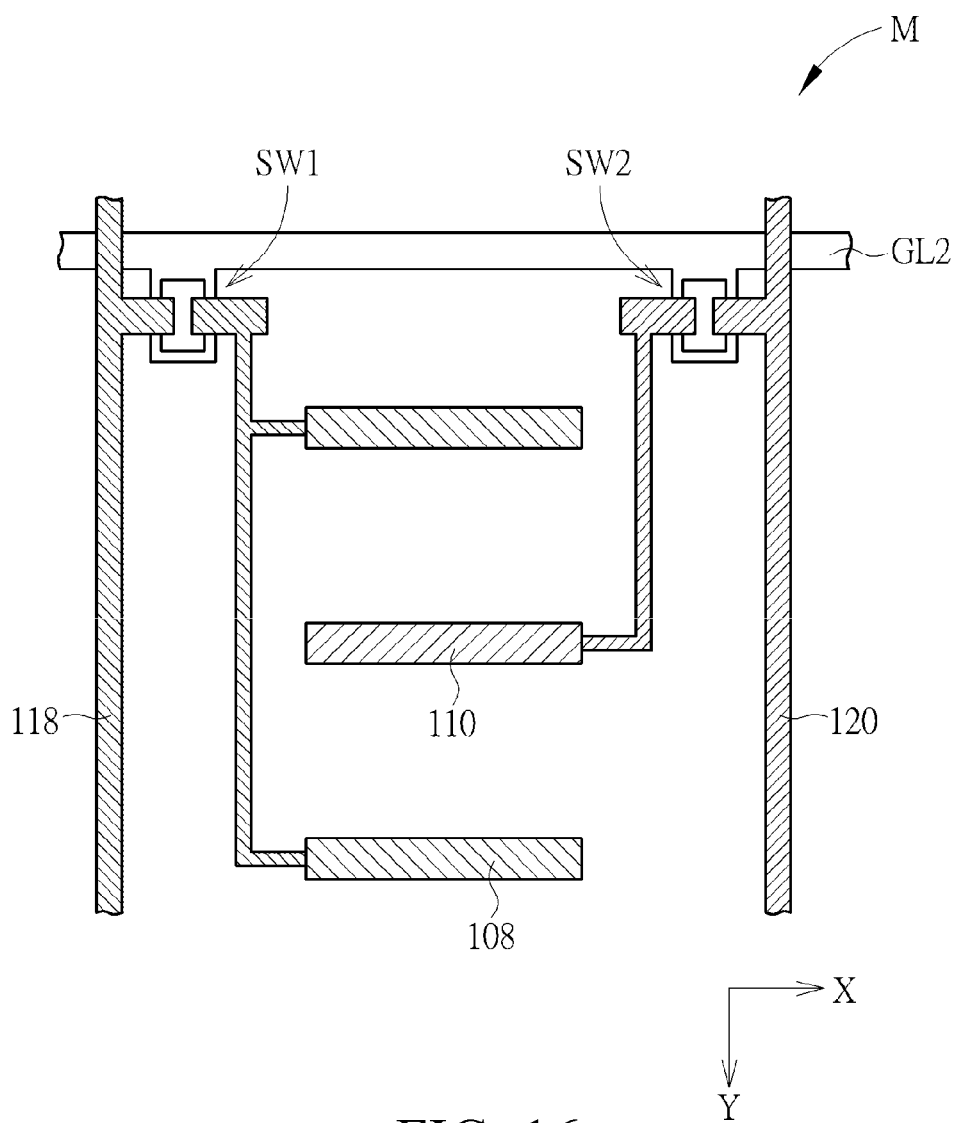
FIG. 16 is an enlarged schematic view of an area M according to a first variant embodiment of the fourth embodiment of the present disclosure.

Referring to FIG. 16, FIG. 16 is an enlarged schematic view of an area M according to a first variant embodiment of the fourth embodiment of the present disclosure. As shown in FIG. 16, the difference between this variant embodiment and the fourth embodiment lies in that the liquid crystal display panel further includes a plurality of second switch devices SW2 disposed on the second substrate 102, and a gate, a source, and a drain of the second switch device SW2 are respectively electrically connected to the second gate line GL2, the second connection line 120, and at least one second stripe electrode 110. The first stripe electrode 108 is electrically connected to the corresponding first connection line 118 by the first switch device SW1, and the second stripe electrode 110 is electrically connected to the corresponding second connection line 120 by the second switch device SW2. In addition, the first switch device SW1 and the second switch device SW2 corresponding to a same pixel may be electrically connected to a same second gate line GL2. The first switch device SW1 and the second switch device SW2 may be disposed at two corners on a same side of the corresponding pixel, but the present disclosure is not limited thereto. In this embodiment, because the first stripe electrode 108 is electrically connected to the corresponding first connection line 118 by the first switch device SW1 and the second stripe electrode 110 is electrically connected to the corresponding second connection line 120 by the second switch device SW2, the first stripe electrode 108 and the second stripe electrode 110 of at least one pixel in a same pixel column may be selected, by using the first switch device SW1 and the second switch device SW2, to respectively receive signals transmitted from the first connection line 118 and the second connection line 120, so as to generate a second voltage difference V2. For example, the voltage of the signal transmitted from the first connection line 118 may be, for example, 4 V, and the voltage of the signal transmitted from the second connection line 120 may be, for example, −4 V, but the present disclosure is not limited thereto. When a pixel needs to be set to dark, an electric field may be generated by the first stripe electrode 108 and the second stripe electrode 110 that correspond to the pixel, to effectively shorten the falling time, thereby effectively shortening the response time.

Figure 17:
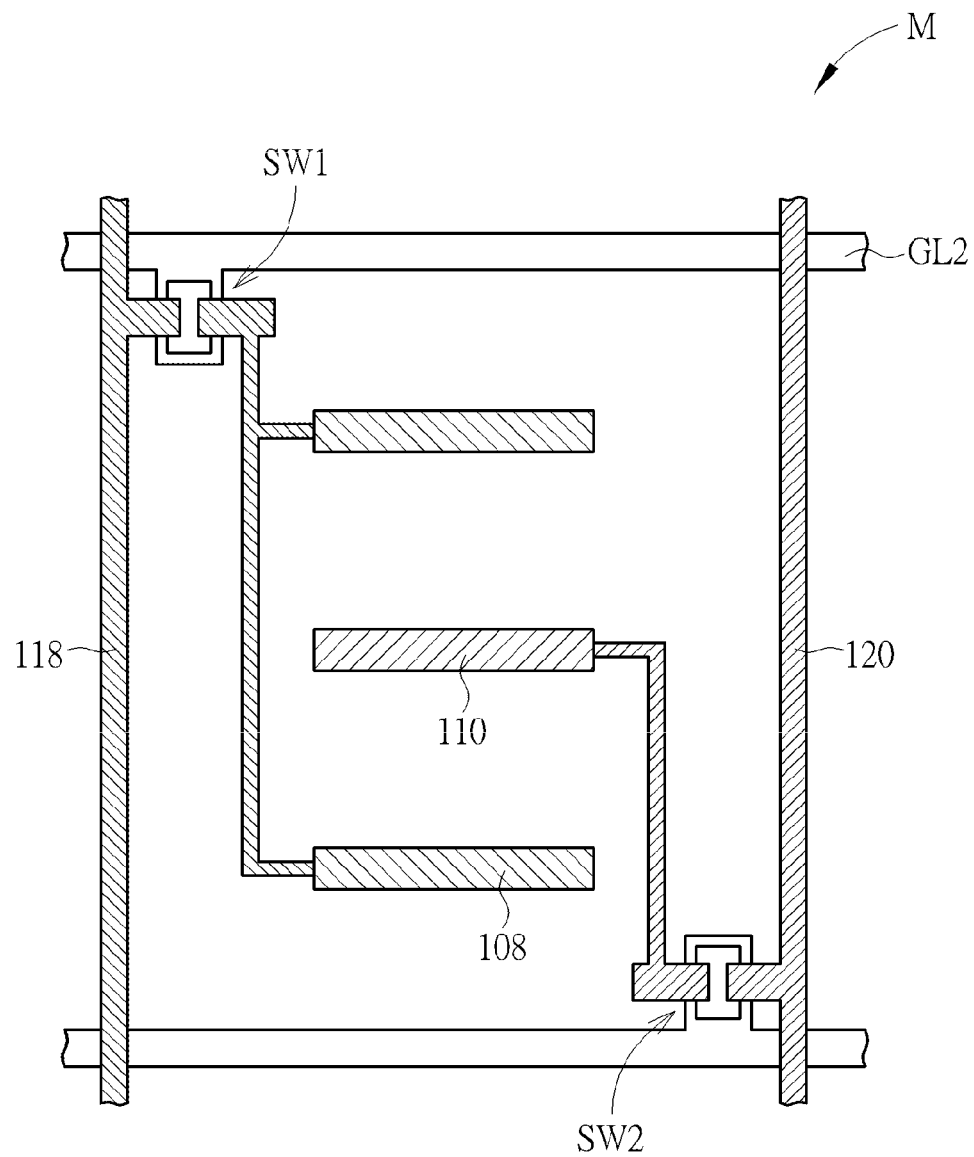
FIG. 17 is an enlarged schematic view of an area M according to a second variant embodiment of the fourth embodiment of the present disclosure.

Referring to FIG. 17, FIG. 17 is an enlarged schematic view of an area M according to a second variant embodiment of the fourth embodiment of the present disclosure. As shown in FIG. 17, the difference between this variant embodiment and the first variant embodiment of the fourth embodiment lies in that the first switch device SW1 and the second switch device SW2 corresponding to a same pixel and the pixel electrodes 106 of the pixel may be respectively electrically connected to different second gate lines GL2. The first switch device SW1 and the second switch device SW2 may be disposed at two opposite corners of the corresponding pixel, for example, at two corners on a diagonal of the pixel, but the present disclosure is not limited thereto.

Based on the above, in the liquid crystal display panel of the present disclosure, the first stripe electrodes and the second stripe electrodes are disposed on the second substrate, and the extension directions of the first stripe electrodes and the second stripe electrodes are not parallel to that of the slit of the pixel electrode. In this way, when image displaying is finished or a pixel needs to be set to dark, a voltage difference can be provided between the first stripe electrode and the second stripe electrode to form an additional electric field, so as to assist in and accelerate the restoration of the long axis of liquid crystal molecules to the initial position. Therefore, the falling time can be effectively shortened, thereby effectively shortening the response time of the liquid crystal display panel.

The foregoing are merely preferred embodiments of the present disclosure, and any equivalent variations and modifications made according to the claims of the present disclosure shall fall within the scope of the present disclosure.

What is claimed is:

1. A liquid crystal display panel, comprising:
   a first substrate;
   a second substrate, disposed facing the first substrate;
   a liquid crystal layer, disposed between the first substrate and the second substrate;
   at least one pixel electrode, disposed between the first substrate and the liquid crystal layer, wherein the at least one pixel electrode comprises at least one slit, and the at least one pixel electrode and the at least one slit extend in a first direction; and at least one first stripe electrode and at least one second stripe electrode, disposed between the second substrate and the liquid crystal layer, wherein the at least one first stripe electrode and the at least one second stripe electrode extend in a second direction, the first direction and the second direction are not parallel to each other, and in a vertical projection direction from the second substrate toward the first substrate, at least a portion of the at least one pixel electrode is disposed between the at least one first stripe electrode and the at least one second stripe electrode, and the at least one first stripe electrode and the at least one second stripe electrode are separated from each other, wherein the at least one first stripe electrode and the at least one second stripe electrode respectively comprise a plurality of stripe sections and a plurality of connection sections, each of the connection sections is used for connecting any two adjacent stripe sections, the stripe sections extend in the second direction, and at least one of the stripe sections overlaps the at least one pixel electrode.

2. The liquid crystal display panel according to claim 1, wherein an acute angle exists between the first direction and the second direction, and the angle ranges from 70 degrees to 90 degrees.

3. The liquid crystal display panel according to claim 2, wherein the first direction is perpendicular to the second direction.

4. The liquid crystal display panel according to claim 1, wherein each of the at least one first stripe electrode and the at least one second stripe electrode has a width, a gap exists between any two adjacent stripe electrodes of the at least one first stripe electrode and the at least one second stripe electrode, and the width is smaller than the gap.

5. The liquid crystal display panel according to claim 1, wherein the liquid crystal display panel comprises a plurality of first stripe electrodes and a plurality of second stripe electrodes, and the first stripe electrodes and the second stripe electrodes are parallel to each other and arranged alternately in sequence.

6. The liquid crystal display panel according to claim 5, wherein the liquid crystal display panel comprises a plurality of pixel electrodes arranged in a plurality of rows, and at least one of the first stripe electrodes and at least one of the second stripe electrodes overlap one row of the pixel electrodes in the vertical projection direction.

7. The liquid crystal display panel according to claim 6, further comprising:

a first connection line, connected to one end of each of the first stripe electrodes, so that the first stripe electrodes are electrically connected to each other, and a second connection line, connected to one end of each of the second stripe electrodes, so that the second stripe electrodes are electrically connected to each other.

8. The liquid crystal display panel according to claim 6, further comprising:

a plurality of first connection lines, respectively connected to one end of at least one of the first stripe electrodes, and the at least one first stripe electrode connected to each of the first connection lines corresponds to one row of the pixel electrodes respectively; and a plurality of second connection lines, respectively connected to one end of at least one of the second stripe electrodes, and the at least one second stripe electrode connected to each of the second connection lines corresponds to one row of the pixel electrodes respectively.

9. The liquid crystal display panel according to claim 1, further comprising a plurality of first switch devices, wherein the at least one first stripe electrode is electrically connected to one of the first switch devices.

10. The liquid crystal display panel according to claim 9, wherein the liquid crystal display panel comprises a plurality of pixel electrodes arranged in a plurality of rows, the liquid crystal display panel further comprises a plurality of first connection lines and a plurality of second connection lines, one of the first connection lines and one of the second connection lines are disposed on two sides of each row of the pixel electrodes respectively, the at least one first stripe electrode is electrically connected to a corresponding first connection line by one of the first switch devices, and the at least one second stripe electrode is connected to one of the second connection lines.

11. The liquid crystal display panel according to claim 9, further comprising a plurality of second switch devices, wherein the at least one second stripe electrode is electrically connected to one of the second switch devices.

12. The liquid crystal display panel according to claim 11, wherein the liquid crystal display panel comprises a plurality of pixel electrodes arranged in a plurality of rows, the liquid crystal display panel further comprises a plurality of first connection lines and a plurality of second connection lines, one of the first connection lines and one of the second connection lines are disposed on two sides of each row of the pixel electrodes respectively, the at least one first stripe electrode is electrically connected to a corresponding first connection line by one of the first switch devices, and the at least one second stripe electrode is electrically connected to a corresponding second connection lines by one of the second switch devices.

13. The liquid crystal display panel according to claim 1, further comprising a common electrode and an insulation layer, wherein the common electrode is disposed between the first substrate and the liquid crystal layer, and the insulation layer is disposed between the at least one first stripe electrode and the second substrate.

14. The liquid crystal display panel according to claim 1, further comprising a common electrode and an insulation layer, wherein the common electrode is disposed between the first substrate and the liquid crystal layer, and the insulation layer is disposed between the at least one first stripe electrode and the liquid crystal layer.

15. A method for driving a liquid crystal display panel, comprising:

providing a liquid crystal display panel, comprising:
a first substrate;
a second substrate, disposed facing the first substrate;
a liquid crystal layer, disposed between the first substrate and the second substrate;
at least one pixel electrode, disposed between the first substrate and the liquid crystal layer, wherein the at least one pixel electrode comprises at least one slit, and the at least one pixel electrode and the at least one slit extend in a first direction;
at least one first stripe electrode and at least one second stripe electrode, disposed between the second substrate and the liquid crystal layer, wherein the at least one first stripe electrode and the at least one second stripe electrode extend in a second direction, the first direction and the second direction are not parallel to each other, and in a vertical projection direction from the second substrate toward the first substrate, at least a portion of the at least one pixel electrode is disposed between the at least one first stripe electrode and the at least one second stripe electrode, and the at least one first stripe electrode and the at least one second stripe electrode are separated from each other; and a common electrode, disposed between the first substrate and the liquid crystal layer;

in a display period, providing at least one first voltage difference between the at least one pixel electrode and the common electrode, wherein there is no voltage difference between the at least one first stripe electrode and the at least one second stripe electrode; and in an idle period, reducing the at least one first voltage difference to below 0.5 V, and providing a second voltage difference between the at least one first stripe electrode and the at least one second stripe electrode.

16. The method for driving a liquid crystal display panel according to claim 15, wherein in the display period, the at least one first stripe electrode, the at least one second stripe electrode, and the common electrode have a same voltage.

17. The method for driving a liquid crystal display panel according to claim 15, wherein each of the at least one first stripe electrode and the at least one second stripe electrode has a width, a gap exists between the at least one first stripe electrode and the at least one second stripe electrode, and the width and the gap satisfy the following formula:

$$0.5 \text{ V/}\mu\text{m} < \frac{V_2}{(W+D)} < 3 \text{ V/}\mu\text{m},$$

wherein W is the width, D is the gap, and $V_2$ is the second voltage difference.

* * * * *